United States Patent
Walters et al.

(10) Patent No.: US 10,583,696 B2
(45) Date of Patent: Mar. 10, 2020

(54) TIRE WITH BEAD REGIONS HAVING MULTIPLE BEAD FILLERS

(71) Applicant: Bridgestone Americas Tire Operations, LLC, Nashville, TN (US)

(72) Inventors: Jacob L. Walters, Medina, OH (US); Atsuo Suzuki, Fairlawn, OH (US); Adam K. Nesbitt, Akron, OH (US); James F. Donahue, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 355 days.

(21) Appl. No.: 15/525,973

(22) PCT Filed: Oct. 21, 2015

(86) PCT No.: PCT/US2015/056672
§ 371 (c)(1),
(2) Date: May 11, 2017

(87) PCT Pub. No.: WO2016/093962
PCT Pub. Date: Jun. 16, 2016

(65) Prior Publication Data
US 2017/0326922 A1 Nov. 16, 2017

Related U.S. Application Data

(60) Provisional application No. 62/089,282, filed on Dec. 9, 2014.

(51) Int. Cl.
*B60C 15/06* (2006.01)
*B60C 13/00* (2006.01)
*B60C 15/00* (2006.01)

(52) U.S. Cl.
CPC .......... *B60C 15/0603* (2013.01); *B60C 13/00* (2013.01); *B60C 15/0081* (2013.01);
(Continued)

(58) Field of Classification Search
CPC .. B60C 15/06; B60C 15/0603; B60C 15/0607
See application file for complete search history.

(56) References Cited

U.S. PATENT DOCUMENTS 3,612,138 A * 10/1971 Ravenhall ............... B60C 15/04
152/543
5,056,575 A * 10/1991 Yamaguchi ............ B60C 15/06
152/541

(Continued)

FOREIGN PATENT DOCUMENTS

EP 0780248 B1 6/1997
EP 1533144 * 5/2005
(Continued)

OTHER PUBLICATIONS

Machine translation of JP 07164839, 1995.*
(Continued)

*Primary Examiner* — Justin R Fischer

(57) ABSTRACT

A tire includes a bead portion with a bead core having a main bead filler and an auxiliary bead filler, and a carcass ply wrapped around a portion of the main bead filler. An end of the carcass ply is located axially outside the main bead filler and radially below an apex of the main bead filler. The auxiliary bead filler is located axially outside the carcass ply end, with an apex of the auxiliary bead filler being located above an apex of the main bead filler.

6 Claims, 3 Drawing Sheets

(52) U.S. Cl.
CPC .......... *B60C 15/06* (2013.01); *B60C 15/0607* (2013.01); *B60C 2015/009* (2013.01); *B60C 2015/061* (2013.01); *B60C 2015/0614* (2013.01); *B60C 2015/0621* (2013.01); *B60C 2015/0625* (2013.01)

(56) References Cited

U.S. PATENT DOCUMENTS

| | | |
|---|---|---|
| 5,117,888 A | 6/1992 | Shimizu |
| 5,294,275 A | 3/1994 | Kawaguchi et al. |
| 6,135,181 A | 10/2000 | Paonessa et al. |
| 2007/0151649 A1 | 7/2007 | Numata |
| 2013/0133806 A1 | 5/2013 | Amano et al. |

FOREIGN PATENT DOCUMENTS

| | | |
|---|---|---|
| FR | 2013540 A1 | 4/1970 |
| JP | H05185812 A1 | 7/1993 |
| JP | 07164839 * | 6/1995 |
| JP | H08197638 A1 | 8/1996 |
| JP | 3568319 B2 | 9/2004 |
| JP | 2007253470 A1 | 10/2007 |
| JP | 2008213365 A1 | 9/2008 |
| JP | 2011126194 A1 | 6/2011 |
| KR | 100553080 | 2/2006 |

OTHER PUBLICATIONS

Machine Translation of FR2013540, dated Apr. 3, 1970.
English Abstract of JPH08197638, dated Aug. 6, 1996.
English Abstract of JP2008213365, dated Sep. 18, 2008.
English Abstract of JP2011126194, dated Jun. 30, 2011.
English Abstract of JP2007253470, dated Oct. 4, 2007.
English Abstract of JP3568319, Sep. 22, 2004.
English Abstract of JPH05185812, dated Jul. 27, 1993.
Machine translation of KR100553080 filed on Feb. 9, 2006 owned by Hankook Tire Mfg Co Ltd.
Marylene Avisse, European Search Report, dated Jun. 14, 2018, European Patent Office, Munich Germany.
Marylene Avisse, European Search Report Opinion, dated Jun. 14, 2018, European Patent Office, Munich Germany.

* cited by examiner

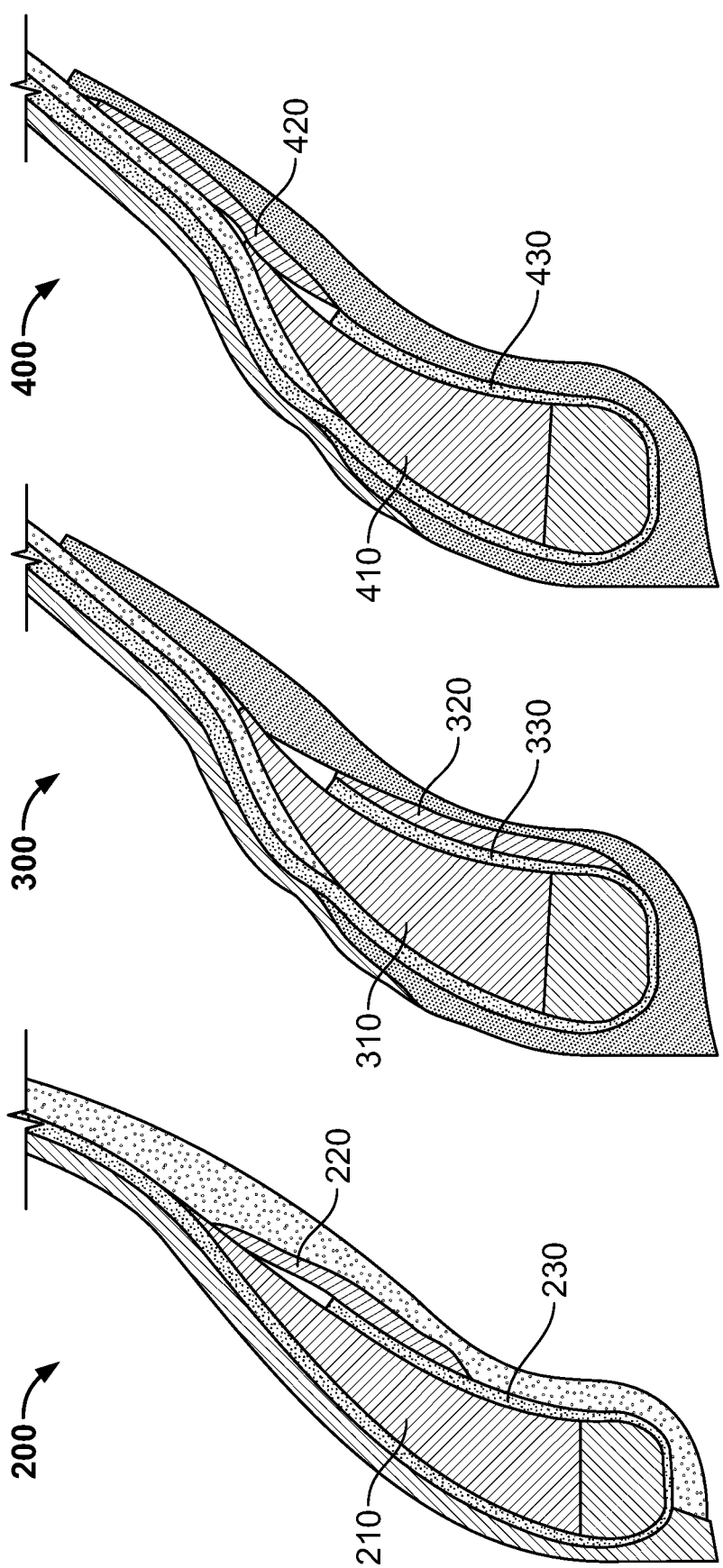

TIRE WITH BEAD REGIONS HAVING MULTIPLE BEAD FILLERS

TECHNICAL FIELD

This disclosure relates to the field of tire construction. More particularly, the disclosure relates to a tire with bead regions having multiple bead fillers.

BACKGROUND

When tires are used, cyclical loading causes tire components to shift and undergo repeated stresses and friction. Such stresses and friction may contribute to durability issues over time. Previous research has shown that the junction between the body ply ending of a tire and the top of an adjacent bead filler has been a point of durability concern.

SUMMARY

In one embodiment, a tire comprises sidewalls, first and second bead portions adjacent to the sidewalls, first and second bead cores each having a main and an auxiliary bead filer, and a carcass ply wrapped around the first and second bead portions. The carcass ply further includes turn-up portions that wrap around at least a portion of the first and second main bead fillers, and the ends of the carcass ply turn-up portions are sandwiched between the main and auxiliary bead fillers. In this embodiment, the first and second auxiliary bead fillers have lower portions in contact with the turn-up portions of the carcass ply, and upper portions in contact with the sidewalls. This embodiment also includes first and second abrasion portions wrapped around the first and second bead portions, respectively.

In another embodiment, a tire comprises a bead portion, a bead core, a main bead filler, a body ply wrapped around a portion of the main bead filler, and an auxiliary bead filler. The body ply has an end located axially outside the main bead filler and radially below a top of the main bead filler. The auxiliary bead filler is disposed axially outside of the main bead filler and axially outside of the body ply end. A top of the auxiliary bead filler is located radially above the top of the main bead filler.

In yet another embodiment, a tire comprises a bead portion, a bead core, a main bead filler, a carcass ply, and an auxiliary bead filler. The carcass ply is wrapped around an axially inner portion of the main bead filler. The carcass ply has an end located axially outside of the main bead filler and radially below an apex of the main bead filler. The auxiliary bead filler is located axially outside the carcass ply end. An apex of the main bead filler is located radially below an apex of the auxiliary bead filler.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 4 is an enlarged cross-section of a single bead portion of another embodiment of a tire, having no abrasion.

FIG. 5 is an enlarged cross-section of a single bead portion of yet another embodiment of a tire, where 100% of an auxiliary bead filler overlaps a carcass ply turn-up portion.

FIG. 6 is an enlarged cross-section of a single bead portion of still another embodiment of a tire, where 0% of an auxiliary bead filler overlaps a carcass ply turn-up portion.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

While similar terms used in the following descriptions describe common tire components, it is understood that because the terms carry slightly different connotations, one of ordinary skill in the art would not consider any one of the following terms to be purely interchangeable with another term used to describe a common tire component.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
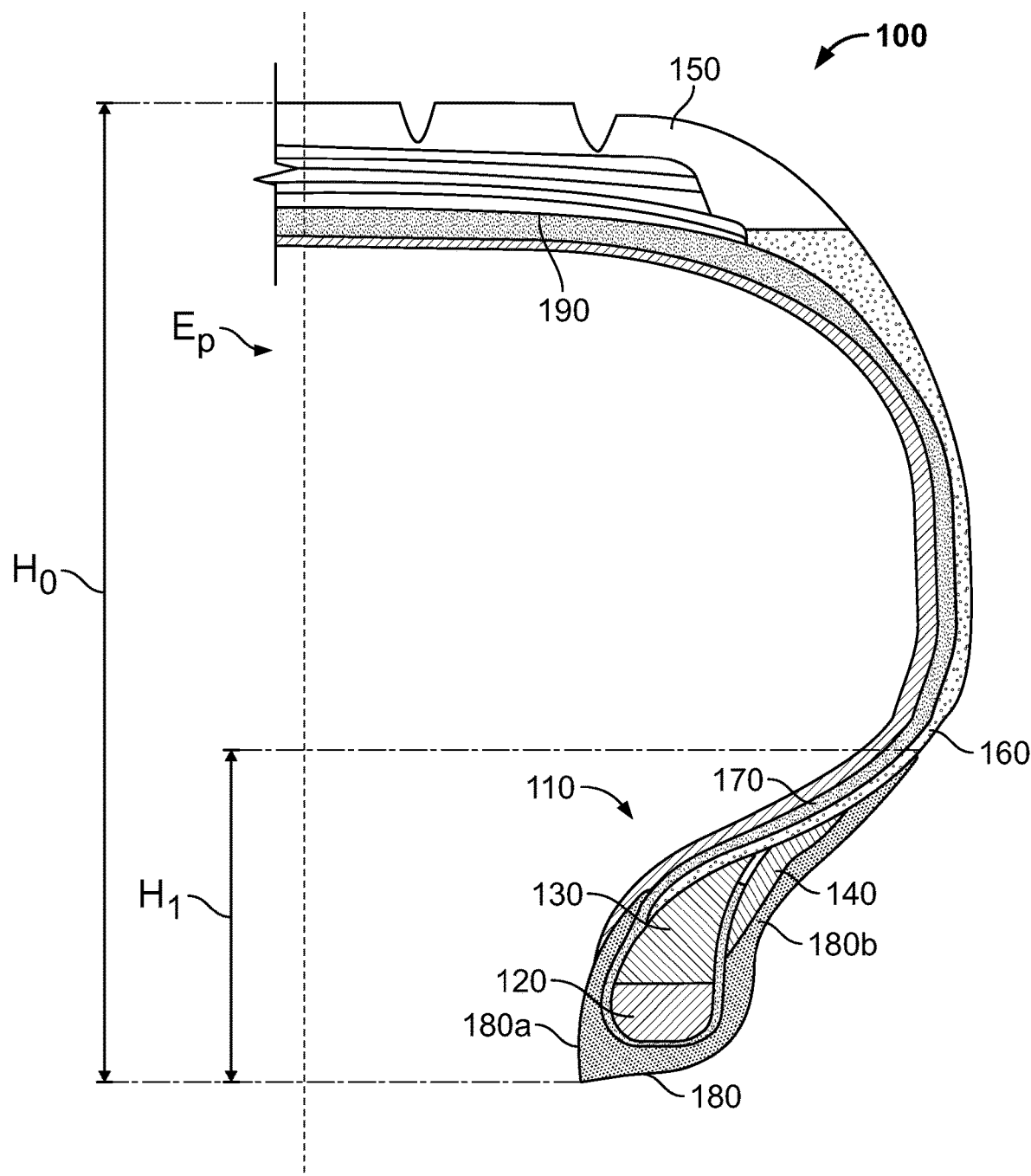
FIG. 1 is a cross-sectional view of one embodiment of a tire.

FIG. 1 is a cross-sectional view of one embodiment of tire 100. Although only half of an upper portion of the tire 100 is depicted in the drawings, it will be appreciated that the other half of the tire 100 is a substantial mirror image of the half depicted. The tire 100 has an equatorial plane $E_p$.

The tire 100 includes a pair of bead portions 110 for attachment to a vehicle wheel (not shown). Bead portions 110 are formed as annular rings, such that the bead portions 110 will extend around an outer circumference of vehicle wheel when installed. Each bead portion 110 includes a bead core 120, a main bead filler 130, and an auxiliary bead filler 140. While a gap is shown between the main bead filler 130 and auxiliary bead filler 140, during vulcanization such a gap may close. In alternative embodiments (not shown), the bead portions 110 may include only a single bead filler, having a slot to receive a carcass ply.

The bead core 120 can be made from any materials known in the art, including for example, metal cords. Main bead filler 130 can be made from a stiff rubber compound. Main bead filler 130 may further be made up of multiple materials, and each material may have a different stiffness (not shown).

With continued reference to FIG. 1, the tire 100 includes a tread 150 that extends circumferentially about the tire 100, and a sidewall 160 that extends between the bead portion 110 and the tread 150. In the illustrated embodiment, a bottom portion of the sidewall 160 extends axially inside of the main bead filler 130, and terminates at a location radially below an apex of the main bead filler 130. A portion of the sidewall 160 is in contact with a portion of the main bead filler 130 and a portion of the auxiliary bead filler 140. The process of extending the bottom of the sidewall 160 inside the main bead filler 130 aids in reducing the weight of the tire while maintaining structural integrity.

The tire 100 further includes a carcass ply (also called body ply) 170 that extends circumferentially about the tire 100 from one bead portion to the other. Although the illustrated tire 100 shows a single carcass ply, it should be understood that two or more plies may be employed in alternative embodiments.

In one embodiment, the carcass ply 170 includes parallel-aligned cords that are radially disposed. In other words, the parallel-aligned cords are oriented substantially perpendicular to the equatorial plane $E_p$ of the tire 100. In alternative embodiments, the carcass ply can include parallel-aligned cords that are biased with respect to the equatorial plane $E_p$ of the tire 100. Additionally, where multiple plies are employed, the cords of different plies may be disposed in different directions. In all cases, the cords can be constructed of, for example, nylon or polyester.

In the embodiment of FIG. 1, the tire also includes a pair of abrasion portions 180 that wrap around each bead portion 110, from an inside end 180a to an outside turn-up end 180b. The outside turn-up end 180b of the abrasion portion 180 is disposed at a height $H_1$ measured radially from the base of the bead portion 110. Preferably, the height $H_1$ of the outside turn-up end 180b is between 10% and 25% of the section height $H_0$ (which is measured from the outer tread surface at the equatorial plane $E_p$ to the base of the bead portion 110). In this embodiment, an apex of the abrasion portion 180 is higher than an apex of the auxiliary bead filler 140. In alternative embodiments (not shown), an apex of the auxiliary bead filler 140 may be above the apex of abrasion portion 180.

In alternative embodiments (not shown), the height $H_1$ of the outside turn-up end 180b is between 0% and 50% of the section height $H_0$ depending on the design.

With continued reference to FIG. 1, the tire 100 further includes a plurality of belts 190 that extend circumferentially about the tire 100. The belts 190 are provided between the tread 150 and the carcass plies 170 as shown in FIG. 1. The belts 190 terminate at edges near a shoulder region of the tire 100. Although the tire 100 illustrated in FIG. 1 features multiple belts, the tire can include a single belt in alternative embodiments (not shown).

In one embodiment, the belt 190 includes parallel-aligned cords or wires that are radially disposed. In alternative embodiments, the belt can include parallel-aligned cords or wires that are biased with respect to the equatorial plane $E_p$ of the tire 100. In all cases, the cords or wires can be constructed of, for example, steel or steel alloys.

Figure 2:
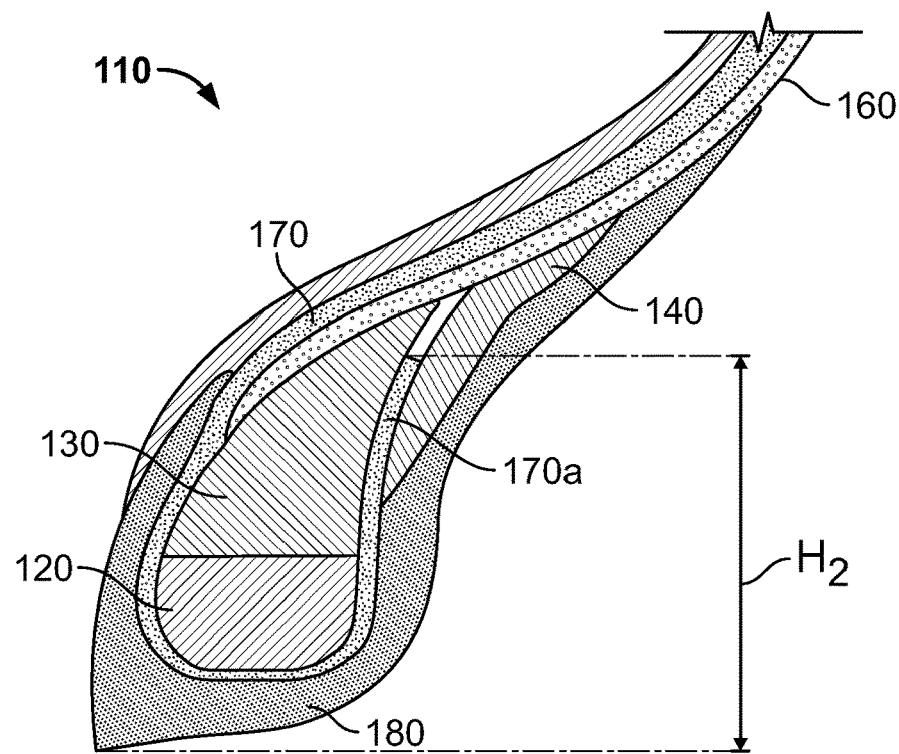
FIG. 2 is an enlarged cross-section of a single bead portion of the tire of FIG. 1.

FIG. 2 shows a close up of one bead portion 110 of the illustrated embodiment for detail. It will be understood to those of ordinary skill in the art that descriptions of the components of a single bead portion 110 of tire 100 will refer to the components of both bead portions 110 of tire 100.

As can be seen in this close-up illustration, the carcass ply 170 is wrapped around bead core 120 and main bead filler 130. In this embodiment, carcass ply 170 extends from one bead portion 110 to the other bead portion 110, extending circumferentially around tire 100. At each bead portion 110, carcass ply 170 wraps underneath bead core 120 and includes a turn-up portion 170a located adjacent to a main bead filler 130. In this embodiment, turn-up portion 170a terminates below an apex of bead core 120. In an alternative embodiment (not shown), the turn-up end 170a extends above the apexes of either or both main and auxiliary bead fillers 130, 140.

With continued reference to FIG. 2, the turn-up portion 170a of the carcass ply 170 is disposed at a height $H_2$ measured radially from the base of the bead portion 110. Preferably, the height $H_2$ of the turn-up portion 170a is between 20% and 40% of the section height $H_0$. In alternative embodiments (not shown), the height $H_2$ of the turn-up portion 170a is between 5% and 50% of the section height $H_0$, depending on the design. In another alternative embodiment, the tire includes multiple carcass plies (not shown), and each carcass ply may have turn-up ends at different heights or at the same height as the other carcass plies.

Sidewall 160 is located adjacent to and axially outside of carcass ply 170. Sidewall 160 extends from bead portion 110 to a tread portion located at a circumferentially outer side of tire 100.

An auxiliary bead filler 140 is located adjacent to turn up portion 170a, on a side opposite to the main bead filler 130. Auxiliary bead filler 140 and main bead filler 130 effectively "sandwich" turn-up portion 170a, sealing turn-up portion 170a from other elements. As seen in FIG. 2, an apex of auxiliary bead filler 140 extends past (radially above) the apex of main bead filler 130, and is in contact with sidewall 160. The auxiliary bead filler 140 thus covers the carcass ply turn-up portion 170a and the top of main bead filler 130, and thereby improves durability of the tire 100. In the illustrated embodiment, the lower end of the auxiliary bead filler 140 is disposed above the lower end of the main bead filler 130 and above the bead core 120. In alternative embodiments (not shown), the lower end of the auxiliary bead filler may extend below the lower end of the main bead filler.

Auxiliary bead filler 140 can be made from any material known in the art, including for example a rubber compound with a relatively higher stiffness compared to the other components of the bead portion 110, to provide rigid support. Auxiliary bead filler 140 may also be made from a rubber compound or other material having a relatively lower stiffness compared to the other components of the bead portion 110. When the auxiliary bead filler 140 has a relatively lower stiffness, the flexibility and durability of the bead portion is improved. Auxiliary bead filler 140 may also be made of two or more different materials, and each material may have a different stiffness (not shown). Auxiliary bead filler 140 may also or alternatively be made of the same or a different material as main bead filler 130.

Figure 3:
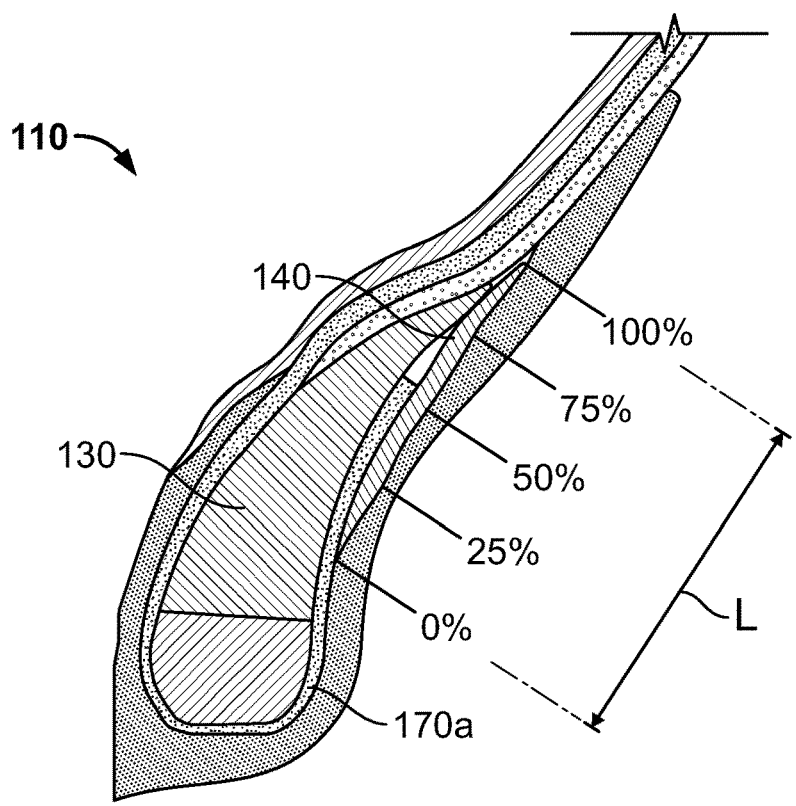
FIG. 3 is an enlarged cross-section view of the tire of FIG. 1, showing 50% of an auxiliary bead filler overlapping with a carcass ply turn-up portion.

Auxiliary bead filler 140 has a length L, as seen in FIG. 3. In this embodiment, approximately 50% of the auxiliary bead filler 140 length L overlaps with carcass ply turn-up 170a. In other embodiments, less or more of the length L may overlap the carcass ply turn-up 170a.

In other alternative embodiments, the tire does not include abrasion portions, and instead the sidewall rubber extends along the outside the bead portions. FIG. 4 shows such an embodiment of a tire bead portion 200. The tire bead portion 200 includes a main bead filler 210, an auxiliary bead filler 220, and a carcass ply turn-up 230.

FIG. 5 shows an alternative embodiment of a tire bead portion 300, having a main bead filler 310, an auxiliary bead filler 320, and a carcass ply turn-up 330. In this embodiment, 100% of the length of the auxiliary bead filler 320 overlaps the carcass ply turn-up 330. The auxiliary bead filler 320 does not contact the main bead filler 310. In this embodiment, the lower end of the auxiliary bead filler 320 extends below the lower end of the main bead filler 310. In alternative embodiments the lower end of the auxiliary bead filler may be disposed above the lower end of the main bead filler and above the bead core.

FIG. 6 shows another alternative embodiment of a tire bead portion 400. The tire bead portion 400 has a primary bead filler 410, an auxiliary bead filler 420, and a carcass ply turn-up 430. In this embodiment, the auxiliary bead filler 420 does not overlap the carcass ply turn-up 430. Here, one end of the auxiliary bead filler 420 is butt spliced with the carcass turn-up 430.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   first and second sidewall portions disposed on opposite sides of the tire, and forming axially outermost points on the opposite sides of the tire;
   a first bead portion located adjacent to the first sidewall portion, and a second bead portion located adjacent to the second sidewall portion;
   the first bead portion including a first bead core and a first main bead filler, wherein a bottom portion of the first sidewall portion extends axially inside of the first main bead filler;
   the second bead portion including a second bead core and a second main bead filler, wherein a bottom portion of the second sidewall portion extends axially inside of the second main bead filler;
   a carcass ply wrapped around respective portions of the first and second bead portions,
      wherein the carcass ply includes turn-up portions that wrap around at least a portion of each of the first and second main bead fillers,
      wherein the turn-up portions of the carcass ply terminate at locations radially below respective apexes of the first and second main bead fillers;
   first and second auxiliary bead fillers, the first and second auxiliary bead fillers having lower portions in contact with the turn-up portions of the carcass ply, and upper portions in contact with the first and second sidewall portions, respectively; and
   first and second abrasion portions wrapped around the first and second bead portions, respectively,
      wherein the first and second abrasion portions are adjacent to the first and second auxiliary bead fillers and the first and second sidewall portions, respectively.

2. The tire of claim 1, wherein the first main bead filler comprises an upper portion made of a first material and a lower portion made of a second material different from the first material, and wherein the second main bead filler comprises an upper portion made of a third material and a lower portion made of a fourth material different from the third material.

3. The tire of claim 2, wherein one carcass ply turn-up portion is located between the first main bead filler and the first auxiliary bead filler, and the other carcass ply turn-up portion is located between the second main bead filler and the second auxiliary filler.

4. The tire of claim 1, wherein an apex of the first abrasion portion is located radially above an apex of the first auxiliary bead filler, and wherein an apex of the second abrasion portion is located radially above an apex of the second auxiliary bead filler.

5. The tire of claim 1, wherein the first and second main bead fillers have a first stiffness, and the first and second auxiliary bead fillers have a second stiffness less than the first stiffness.

6. The tire of claim 1, wherein the first auxiliary bead filler has a lower end radially above and axially outside the first bead core, and wherein the second bead filler has a lower end radially above and axially outside the second bead core.

\* \* \* \* \*